May 25, 1954
N. RAAG
2,679,548
ELECTRIC DRY CELL
Filed July 23, 1951
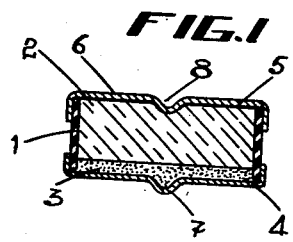
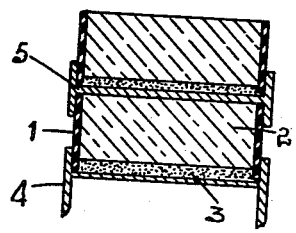
Inventor
Nicolai Raag
By Wenderoth, Lind & Ponack
Attorneys Patented May 25, 1954

2,679,548

UNITED STATES PATENT OFFICE 2,679,548

ELECTRIC DRY CELL

Nikolai Raag, Sundbyberg, Sweden

Application July 23, 1951, Serial No. 238,122

Claims priority, application Sweden February 13, 1951

2 Claims. (Cl. 136—111)

This invention relates to electric dry cells of the kind comprising a negative electrode and a positive electrode and interposed therebetween a layer of an electrolyte absorbent and a layer of a depolarizer.

In the construction of electric dry cells difficulties are always encountered due to the fact that gases will be formed and that the electrolyte will expand due to formation of heating the electrolytic processes in the cell. The expanded electrolyte together with the pressure of the gases formed will force the electrolyte out of the cell if special provision has not been made in order to prevent such drawbacks. In order to avoid the inconveniences referred to the cells have been provided with special arrangements such as cavities for collecting the gases, and spaces permitting expansion of the electrolyte. Such arrangements, however, are bulky, and in addition they are difficult to accomplish when air depolarized cells are concerned in which case it must not only be possible for gases to escape but also for ambient air to enter.

This invention has for its object to dissolve the problems above referred to in a very simple fashion which enables an extensive simplification of the construction of cells of the kind indicated.

The inventive cell is mainly characterized in that the electrolytic layer consists of a chemically indifferent substance, such as kieselguhr, diatomaceous earth, terra silicea, silica-gel or any similar so-called electrolyte carrier which, on one hand, is sufficiently liquid adsorbent to enable the electrolyte liquid to be introduced into the depolarization composition and to penetrate into the electrolyte carrier, and, on the other hand, is sufficiently porous to be able to permit gases formed in the operation of the cell to pass therethrough.

The electrolytic layer of the cell according to the invention is fundamentally different from all of those hitherto known, both in its composition and in its principles of operation.

This electrolytic layer comprises a so-called electrolyte carrier which may be introduced into the cell in dry condition and is able to absorb an electrolyte added to the depolarizer.

The purpose of the electrolyte carrier is to prevent the electrolyte from being exuded from the cell and to simultaneously permit the escape of gases.

Suitable electrolyte carriers are chemically resistant, inorganic substances having a high degree of capillary porosity, such as kieselguhr, diatomite, terra silicea, silica-gel, fine quartz sand and others.

Owing to its high porosity, the electrolytic carrier has the property of equalizing the moisture throughout the interior of the cell, i. e. equilibrating the moisture in the depolarizer and the electrolytic layer. This condition prevents the possibility of the electrolyte and of water formed at the electrolytic reactions from being forced out of the cell. The electrolytic layer is so absorbent that it will always be moist only, but not to such an extent as not to be able to pass the gases. The last-mentioned circumstance dissolves the problem about the escape of the gases, since the latter can leave the cell by diffusion through the electrolyte carrying layer. In cells constructed according to the principles of air depolarization, the air admission into the cell will take place in the analogous fashion but in the opposite direction.

Further features of a cell constructed according to the invention will be set forth in the accompanying drawing illustrating two slightly different embodiments. In the drawing:

Fig. 1 is a cross-section through one embodiment.

Fig. 2 is a cross-section through the other embodiment.

In both embodiments the cell consists of a ring 1 made of insulating material, such as plastic, Bakelite, glass, cardboard or the like, and in which ring there is a layer 2 of a depolarizer composition or mix wet with an electrolyte and based on active carbon, manganese dioxide or any other depolarizing substance. In the ring 1 there is further a layer 3 of a chemically indifferent substance, such as kieselguhr, diatomaceous earth, terra silicea, silica-gel or any similar so-called electrolyte carrier which is able to adsorb sufficient amount of a liquid electrolyte added to the depolarizer and to pass gases formed in the operation of the cell. Contacting layer 3 is a negative zinc electrode in the form of a flanged plate 4 the flanges of which closely engage the ring 1.

The positive electrode 5 contacting the other side of the depolarization layer consists of a conducting layer or foil of graphite and any suitable binder and having sufficiently low specific resistance to electric current.

Foil 5 is in the construction shown in Fig. 1 covered by a cap 6 suitably made of light metal, said cap pressing the foil into firm engagement with the depolarization composition and its edge portion closely fitting around the ring 1.

The foil 5 is moisture and acid resistant so that the electrolyte cannot penetrate the same and come into contact with the metal cap 6. It may suitably consist of graphite bonding agent, such as various kinds of natural resin or synthetic rubber plastics such as Buna or Opanol, which is relatively tough.

In the plate 4 there is an impressed projection 7, and in the cap 6 a corresponding impression 8, or vice versa. The purpose of these is to enable the cells to be aligned when being assembled into batteries, as well as to create reliable content between the electrodes.

In the embodiment shown in Fig. 2, the zinc electrode 4 is provided with double-sided flanges making the cap 6 superfluous.

The depolarization composition should suitably hold sufficient moisture content to be able to impart a portion thereof to the electrolyte carrying layer if the latter is much drier than the depolarizer. However, the latter need not have any material moisture content initially since a certain amount of water will always be formed in the depolarization process. The depolarizer may as the main constituent contain active carbon compressed to a suitable extent, but the same may also be built up on the basis of manganese dioxide or any suitable other depolarization material. In certain cases active carbon will be more suitable than manganese dioxide because active carbon is capable of retaining more than 45% moisture, whilst manganese dioxide cannot retain more than about 12% moisture.

To the depolarization mix an electrolyte should be added which may as active constituent contain ammonium chloride and as extra ingredients zinc chloride and mercuric chloride, if desired.

The electrolyte carrying layer 3, consisting suitably of absolutely pure kieselguhr or the like, may suitably be introduced in dry condition. However, it should be noted here that this layer must not be of such large thickness that it prevents water and electrolytic salts from the depolarization composition from penetrating completely therethrough and contact the zinc electrode 4.

The electrolyte carrying layer, however, need not necessarily by dry upon its being introduced into the cell, but it may also be moist. Further, the electrolyte solution may be added directly to the electrolyte carrier although this will involve greater difficulties than adding the electrolyte solution to the depolarizer.

The amount of depolarizer may, of course, be substantially varied. By way of example may only be mentioned that, if the depolarizer consists of active carbon having a moisture content of about 45%, then the amount thereof may, to advantage, be 8 to 10 times larger than the amount of electrolyte carrier.

The composition of the depolarizer may suitably be such that one cubic centimeter thereof, depending on the load intensity, gives an average amount of energy of 0.25 to 0.50 ampere-hours before the voltage decreases to 0.9 volt. The initial cell voltage is 1.6 volts, and after 1 to 2 weeks in unloaded condition the voltage will be 1.4 volts which is maintained even after a storage time of more than 1 year.

It will be understood that the invention is not restricted to the embodiments described in the foregoing and illustrated in the drawing but the same may be varied in several ways within the scope set forth in the appended claims.

What I claim and desire to secure by Letters Patent is:

1. An electrolytic dry cell comprising a negative electrode and a positive electrode, a layer of electrolytic composition and a layer of depolarized disposed between said two electrodes, an electrolyte dispersed in said layers, said electrolytic layer comprising an electrolyte carrier having a high porosity and said electrolytic layer communicating with the ambient atmosphere and being sufficiently porous to be penetrable for gases and also being liquid adsorbing to adsorb electrolyte from the depolarizer, an annular casing of insulating material, said depolarizer and said electrolyte carrier being placed in said annular casing of insulating material, said negative electrode being formed by a flanged cover for said casing, said positive electrode being formed by a flanged foil, and said flanged foil being covered by a flanged cap.

2. An electrolytic dry cell as claimed in claim 1, in which said negative electrode is made of zinc, said positive electrode being made of carbon and a rubber plastic bonding agent and said flanged cap being made of metal, said positive electrode being interposed between said flanges of said cap and the outer sides of said annular ring and being unpenetrable for said electrolyte, thus preventing said electrolyte from coming into contact with said cap.

References Cited in the file of this patent

UNITED STATES PATENTS

| Number | Name | Date |
| --- | --- | --- |
| 1,613,586 | Rosendal Dam | Jan. 4, 1927 |
| 2,582,973 | Ellis | Jan. 22, 1952 |
| 2,591,355 | Heraud | Apr. 1, 1952 |
| 2,597,116 | Marsal | May 20, 1952 |

OTHER REFERENCES

Ser. No. 394,417, Marhenkel (A. P. C.), published May 11, 1943.